Nov. 15, 1966 NAOJI TAMURA ET AL 3,285,486

PINCH ROLLER OPERATING DEVICE FOR MAGNETIC RECORDER

Filed Aug. 7, 1964 2 Sheets-Sheet 1

INVENTORS
NAOJI TAMURA
MASAHARU HORIUCHI

BY Hill, Sherman, Meroni, Gross & Simpson ATTORNEYS

PINCH ROLLER OPERATING DEVICE FOR MAGNETIC RECORDER

Filed Aug. 7, 1964 2 Sheets-Sheet 2

INVENTORS
NAOJI TAMURA
MASAHARU HORIUCHI

BY Hill, Sherman, Meroni, Gross, & Simpson ATTORNEYS

United States Patent Office 3,285,486

Patented Nov. 15, 1966

3,285,486

PINCH ROLLER OPERATING DEVICE FOR MAGNETIC RECORDER

Naoji Tamura, Tokyo, and Masaharu Horiuchi, Kawasaki-shi, Japan, assignors to Kabushikikaisha Taiko Denki Seisakusho (Taiko Electric Works Ltd.), Tokyo, Japan, a corporation of Japan Filed Aug. 7, 1964, Ser. No. 388,055

Claims priority, application Japan, Aug. 15, 1963, 38/61,296

4 Claims. (Cl. 226—180)

This invention relates to improvements in or relating to a pinch roller operating device for tape or wire recorders of the type that when the recorder is not in use a pinch roller shaft lies substantially flat and, if necessary, remains concealed under a chassis, and when the recorder is in actual use the shaft stands upright to press a pinch roller against a capstan, more particularly to a pinch roller operating device in which a pinch roller is pressed against a capstan at a constant pressure and movements of a pinch roller shaft are carried out smoothly and accurately.

Such a device is very suitable for use particularly in, for example, a magazine-type tape recorder, since a tape can easily be put between a pinch roller and a capstan when a tape magazine is attached to or detached from the recorder and accordingly the overall structure of the recorder can be simplified.

One object of this invention is to provide a pinch roller operating device for magnetic recorders in which a pinch roller can easily be made to stand and fall with respect to a capstan by a single repeating action of a simple lever mechanism.

Another object of this invention is to provide a pinch roller operating device for magnetic recorders in which a pinch roller shaft is rotated to bring a pinch roller into abutment with a capstan lightly without shock.

A further object of this invention is to provide a pinch roller operating device for magnetic recorders in which a pinch roller shaft is rotated to a dead point by an external force through a lever mechanism and thereafter rotated by means of a spring to press a pinch roller against a capstan.

Figure 1:
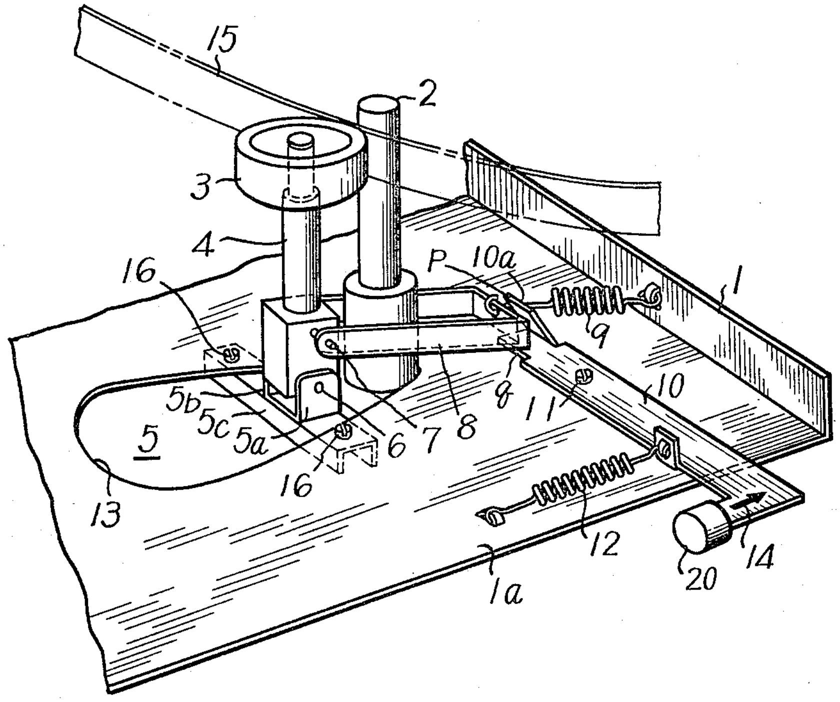
Figure 3:
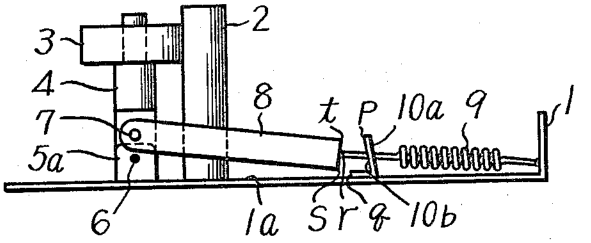

Other objects, features and advantages of this invention will be apparent from the following description taken in conjunction with the accompanying drawings in which:

FIGURE 1 is a perspective view of an example of a pinch roller operating device for magnetic recorders according to this invention;

FIGURES 2A to 2F, inclusive, are schematic side views of the device shown in FIGURE 1, for explaining fundamentally operative conditions of the device; and FIGURE 3 is a similar side view of the device shown in FIGURE 1.

With reference to the drawings, an embodiment of the pinch roller operating device according to this invention will hereinafter be explained in detail. FIGURE 1 is a perspective view of the pinch roller operating device, in which the device is mounted on a sub-chassis or a frame 1. 2 is a capstan which is driven by a motor (not shown in the drawing) at a predetermined speed, 3 is a pinch roller, and 4 is a pinch roller shaft. A magnetic tape 15 is driven at a constant speed gripped between the capstan 2 and the pinch roller 3. The pinch roller shaft 4 may be turned about a pin 6 fixed on a bearing 5 which is preferably formed by a pair of confronting lugs *5a* and *5b*. The lugs *5a* and *5b* are formed integrally with a metal piece *5c* which is so mounted, by means of screw 16, on the inner side of the sub-chassis

*1a* that the lugs *5a* and *5b* are extended upwardly through the hole 13.

The pinch roller shaft 4 has two stable stationary conditions. That is, the shaft 4 stands upright to press the tape 15 against the capstan as shown in the figure in its operative position and it lies flat to be placed in the hole 13 of the sub-chassis 1 in its nonoperative position. The sub-chassis 1 is attached to the underside of a chassis (not shown in the drawing) having mounted thereon all necessary parts for a tape recorder. In FIGURE 1, there are illustrated, for the sake of simplicity, only the upper portion of the capstan 2 and the pinch roller shaft 4 with the pinch roller 3 thereon protruding from the sub-chassis 1. On the pinch roller shaft 4 is fixed a pin 7, to which are pivoted the ends of the respective arms of a U-shaped operating arm 8 and the rear end of the arm is connected to the sub-chassis 1 by a spring 9 to be pulled in the backward direction. As a result of this, the pinch roller 3 is pressed against the capstan 2 at a constant pressure. 10 is a lever for setting up and bringing down the pinch roller shaft 4, which lever is attached to the sub-chassis 1 with a pin 11 as a pivot at the intermediate portion thereof and moves about the pin 11. The lever is always biased by a spring 12 in the clockwise direction and accordingly a top end *10a* of the lever 10 is kept apart from the operating arm 8. To the other end of the lever 10 is attached a pushbutton 20 which serves to push the lever 10 in the direction such as shown by the arrow 14. When the lever 10 is turned in the direction of the arrow 14 against the spring 12, the top end *10a* of the lever 10 pushes the operating arm 8 to the left, thereby rotating the pinch roller shaft 4 about the pin 6 in the anticlockwise direction to lie flat. Removing the force applied to the lever 10, the lever 10 is pulled back to its initial position by the spring 12. Pushing again the lever 10 in the direction of arrow 14, the pinch roller shaft 4 rotates about the pin 6 in the clockwise direction to stand upright. By repeating such operation the pinch roller shaft 4 repeats to stand and fall alternately.

The principle of the operation will hereinbelow be explained with reference to FIGURE 2. FIGURES 2A to 2F, inclusive, are side views of the device shown in FIGURE 1 and parts corresponding to those in FIGURE 1 are marked with the same numeral references.

Figure 2A:
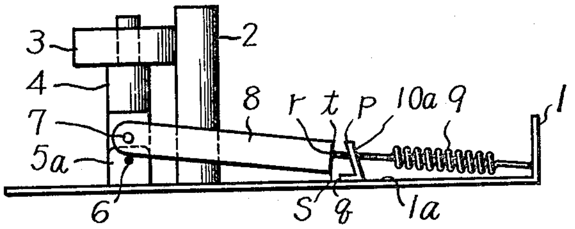
Figure 2B:
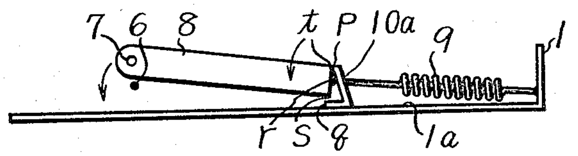
Figure 2C:
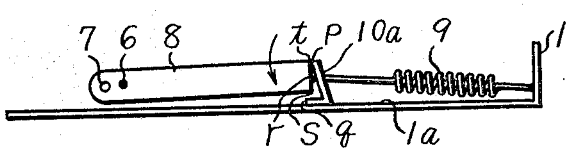
Figure 2D:
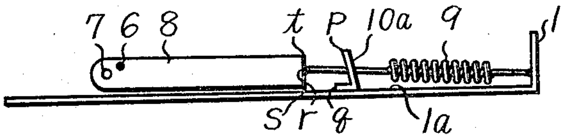

In the figures, the lever 10 pushes the operating arm 8 at points either $p$ or $q$ respectively on the upper and lower portions of the top end of the lever 10. The point $p$ is upper than the connecting point $r$ of the spring 9 and the operating arm 8, the point $q$ is lower than the point $r$. FIGURE 2A illustrates an operative condition of the recorder in which the pinch roller shaft 4 stands upright and is pulled by the spring 9 to press the pinch roller 3 against the capstan 2 with the tape 15 gripped therebetween. In this case the lower point $s$ on the end of the operating arm 8 is not in contact with the bottom *1a* of the sub-chassis 1 on account of the heights of the pin and the right-hand position where the spring 9 is attached to the sub-chassis 1. Pushing the lever 10 to the left as shown by the arrow 14 in FIGURE 1, the lever 10 pushes the operating arm 8 at the point $p$ and thereabout as illustrated in FIGURE 2B. As the operating arm 8 moves to the left, the pin 7 is also pushed in the same direction and the pinch roller shaft 4 begins to fall. So long as the top end of the lever 10 pushes the operating arm 8, the spring 9 does not ever pull the pin 7 and instead a rotational force which tends to turn the operating arm 8 about the point $p$ in the direction of the arrow, is produced by the spring 9. When the lever 10 is pushed sufficiently to reach its dead point where the pins 7 and 6 and the point $p$ align, the lever 10 cannot push further the operating arm 8, but the pinch roller shaft 4 comes down to a position a little past its dead point owing to the aforesaid rotational force and the pivoted connection between the pin 7 and the operating arm 8 (FIGURE 2C). When the lever 10 has returned to its initial position the spring 9 pulls again the pin 7 and since the point *r* is lower than the point *p*, the operating arm 8 is pulled to the right at a point further past the dead point and accordingly the pinch roller shaft 4 lies flat completely (FIGURE 2D). The recorder is arranged to be nonoperative at this time. As the pinch roller shaft 4 falls, there is caused a force which tends to push down the rear end of the operating arm 8. However, this force does not become so large, and hence the rear end is prevented from going down by friction between the point *p* and the operating arm 8 and the point *q* does not ever push the operating arm 8. As illustrated in FIGURE 2D, when the lever 10 has returned to its initial position the right lower end portion *s* of the lever 8 falls into contact with the bottom 1*a* of the sub-chassis 1 for the first time.

Figure 2E:
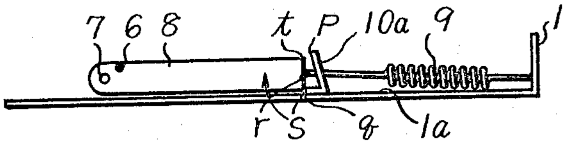
Figure 2F:
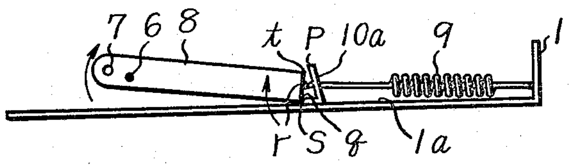

When the lever 10 is pushed again the point *q* pushes the operating arm 8 and the rotational force due to the spring 9 becomes opposite in direction to that in the foregoing, as is illustrated in FIGURE 2E, since the point *s* has lowered. Releasing the lever 10 after having pushed it to its dead point (FIGURE 2F), merely the rotational force reverses in direction and the pinch roller shaft 4 goes up through exactly the same processes as those described above and then the recorder can be operated as illustrated in FIGURE 2A.

With an arrangement that the point *s* on the lower end of the operating arm 8 may lower to such an extent that the bottom 1*a* may function as a stopper, the point *s* may easily get in contact with the bottom 1*a* when the pinch roller shaft 4 lies flat and accordingly the point *q* pushes the operating arm 8 without fail. However, when the pinch roller shaft 4 is standing the height of the right end portion of the operating arm 8 is not always constant due to vibration or the way of attachment of the spring 9 because the right end portion of the arm 8 stays above the bottom 1*a* and, as a result of this, the point *p* does not always push the operating arm 8 accurately. To avoid this a lever 10 such as shown in FIGURE 1 or 2 is preferable to use. That is, the face of the lever 10 opposite to the operating arm 8 is inclined as illustrated in the figure and the height of the inclined face 10*b* is made fully higher than the point *t* on the rear end of the operating arm 8. Thus, even if the height of the point *t* varies a little, the lever 10 pushes the arm 8 at the point *t* since the face 10*b* is inclined. There is a fear that the end face *t–s* of the operating arm 8 slides down along the inclined face 10*b* as the inclined face 10*b* pushes the point *t* to bring down the pinch roller shaft 4. To avoid this, the point *q* is located at the left much more than the point *p* of the inclined face 10*b*. That is, the point *q* is arranged to be positioned under the right end portion of the operating arm 8 when the point *t* gets in contact with the inclined face 10*b*. That is, the lever 10 has the end portion *q* extending from the inclined face 10*b* in the direction of the length of the operating arm 8.

According to this invention, the standing and falling movements of the pinch roller shaft can be carried out alternately only by repeating pushing and releasing of a single lever 10 and further the spring used for the movements serves to press the pinch roller 3 against the capstan 2, as described in the foregoing. In addition, since the pinch roller shaft 4 is moved to its dead point by an external force and thereafter moved by the force of the spring 9, an angle that the shaft moves due to the force of the spring can be made extremely small and accordingly the pinch roller 3 is prevented from shocking the capstan 2. Furthermore, the device of this invention is simple in structure and stable in operation. Thus, the present invention has many remarkable advantages.

It will be apparent that many modifications and variations may be effected without departing from the scope of the novel concept of this invention.

What is claimed is:

1. A pinch roller operating device for magnetic recorders comprising a capstan rotating at a predetermined speed, a pinch roller cooperating with said capstan to drive a magnetic medium therebetween a pinch roller shaft carrying said pinch roller and pivoted rotatably at a stationary part to stand and fall with respect to said capstan, an operating arm attached to said pinch roller shaft at a position different from said pivot and rotating said pinch roller shaft about said pivot, a spring pressing said pinch roller against said capstan, and means for pushing alternately the upper and lower sides of the free end of said operating arm so that said pinch roller shaft can repeat the stand and fall operations alternately in accordance with every reciprocal movement of said operating arm due to the pushing forces effected alternately upon said upper and lower sides of said free end of said operating arm.

2. A pinch roller operating device for magnetic recorders as claimed in claim 1, wherein said pinch roller shaft supports said pinch roller on its upper end portion and includes a pivot attached to a case on its lower end portion and is pivoted to the free end of said operating arm at its intermediate portion, and said case has a window through which said pinch roller is brought down under said case when said pinch roller shaft falls.

3. A pinch roller operating device for magnetic recorders as claimed in claim 1, wherein said operating arm is formed to be U-shaped, two confronting free ends of said arm being pivoted to a pin protruding from said pinch roller shaft, said spring for pressing said pinch roller against the capstan extending between the other end of the operating arm and a case a lever, one end of the lever pivoted to said case at its intermediate portion being engageable with said other end of said operating arm, and a second spring for pulling the free end of said lever away from said operating arm being attached to said lever.

4. A pinch roller operating device for magnetic recorders as claimed in claim 1, including a lever having an end portion extending from a face suitably inclined to an end face of said operating arm, said end portion extending in the direction of the length of said operating arm past a marginal edge opposite to that getting in contact with said inclined face first in the width direction of the end face of said operating arm.

References Cited by the Examiner

UNITED STATES PATENTS

| | | | |
|---|---|---|---|
| 2,876,005 | 3/1959 | Eash | 74—213 |
| 3,023,943 | 3/1962 | Schober | 242—55.13 X |
| 3,027,112 | 3/1962 | Flan. | |
| 3,096,920 | 7/1963 | Schober | 226—180 X |
| 3,113,708 | 12/1963 | Moulic. | |
| 3,154,956 | 11/1964 | Eash | 74—213 X |

M. HENSON WOOD, Jr., *Primary Examiner.*

A. N. KNOWLES, *Assistant Examiner.*